United States Patent
Lin et al.

(10) Patent No.: US 11,290,697 B2
(45) Date of Patent: Mar. 29, 2022

(54) PERSPECTIVE TRANSFORMATION OF IMAGES VIA TOUCH SIGNALS

(71) Applicant: Hewlett-Packard Development Company, L.P., Spring, TX (US)

(72) Inventors: Yu-Hsuan Lin, Taipei (TW); Santiago Reyero, San Diego, CA (US); Elissa Melor Berver, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/048,135

(22) PCT Filed: Jun. 27, 2018

(86) PCT No.: PCT/US2018/039785
§ 371 (c)(1),
(2) Date: Oct. 16, 2020

(87) PCT Pub. No.: WO2020/005233
PCT Pub. Date: Jan. 2, 2020

(65) Prior Publication Data
US 2021/0152797 A1    May 20, 2021

(51) Int. Cl.
*H04N 9/31* (2006.01)
*G06F 3/041* (2006.01)

(52) U.S. Cl.
CPC ......... *H04N 9/3185* (2013.01); *G06F 3/0416* (2013.01); *H04N 9/3194* (2013.01)

(58) Field of Classification Search
CPC .. H04N 9/3185; H04N 9/3194; G06F 3/0416; G06F 3/0418; G06F 3/0426
See application file for complete search history.

(56) References Cited

U.S. PATENT DOCUMENTS

| | | | |
|---|---|---|---|
| 7,125,122 B2 | 10/2006 | Li et al. | |
| 2004/0155965 A1* | 8/2004 | Jaynes | H04N 9/3185 348/189 |
| 2005/0046804 A1 | 3/2005 | Akutsu | |
| 2008/0042999 A1* | 2/2008 | Martin | G03B 21/132 345/178 |
| 2011/0025650 A1 | 2/2011 | Joscelyne | |
| 2011/0228104 A1* | 9/2011 | Nelson | H04N 9/3147 348/190 |

(Continued)

FOREIGN PATENT DOCUMENTS

CN    103809880 A  *  5/2014  .......... G06F 3/0418
EP    1814324 A4       1/2010

*Primary Examiner* — David D Davis
(74) *Attorney, Agent, or Firm* — Rahman LLC

(57) ABSTRACT

An example calibration device includes a projector to project a first image onto a touch screen. The first image includes a first set of four corner coordinates. A processor is to perform a first perspective transformation of the first image into a second image for projection onto the touch screen by the projector. The second image includes a second set of four corner coordinates. The processor is to receive at least one touch signal associated with a second set of four corner coordinates associated with the second image from the touch screen. The processor is to perform a second perspective transformation of the second image using the second set of four corner coordinates to resize the second image based on the first set of four corner coordinates.

20 Claims, 13 Drawing Sheets

(56) References Cited

U.S. PATENT DOCUMENTS

| | | |
|---|---|---|
| 2012/0200588 A1 | 8/2012 | Posa et al. |
| 2014/0160341 A1* | 6/2014 | Tickoo ............... H04N 5/23206 |
| | | 348/333.12 |
| 2015/0189267 A1* | 7/2015 | Kaji ...................... G06T 3/0093 |
| | | 348/187 |
| 2017/0180689 A1* | 6/2017 | Morrison ............. H04N 9/3185 |
| 2018/0220114 A1* | 8/2018 | Ouchi .................. H04N 9/3185 |

* cited by examiner

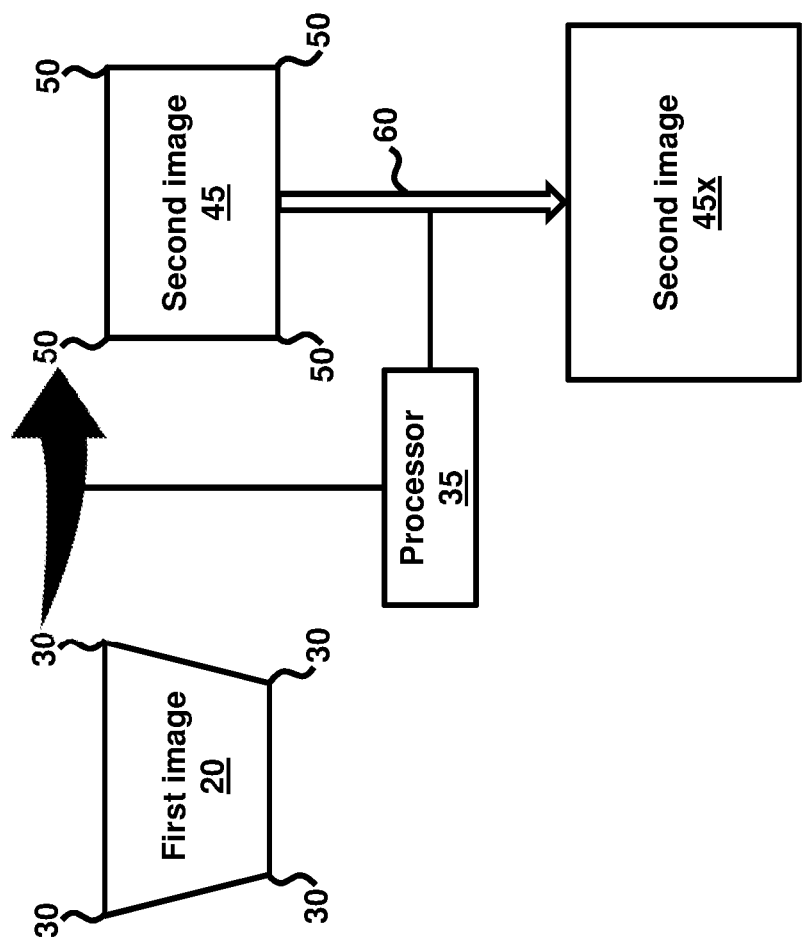

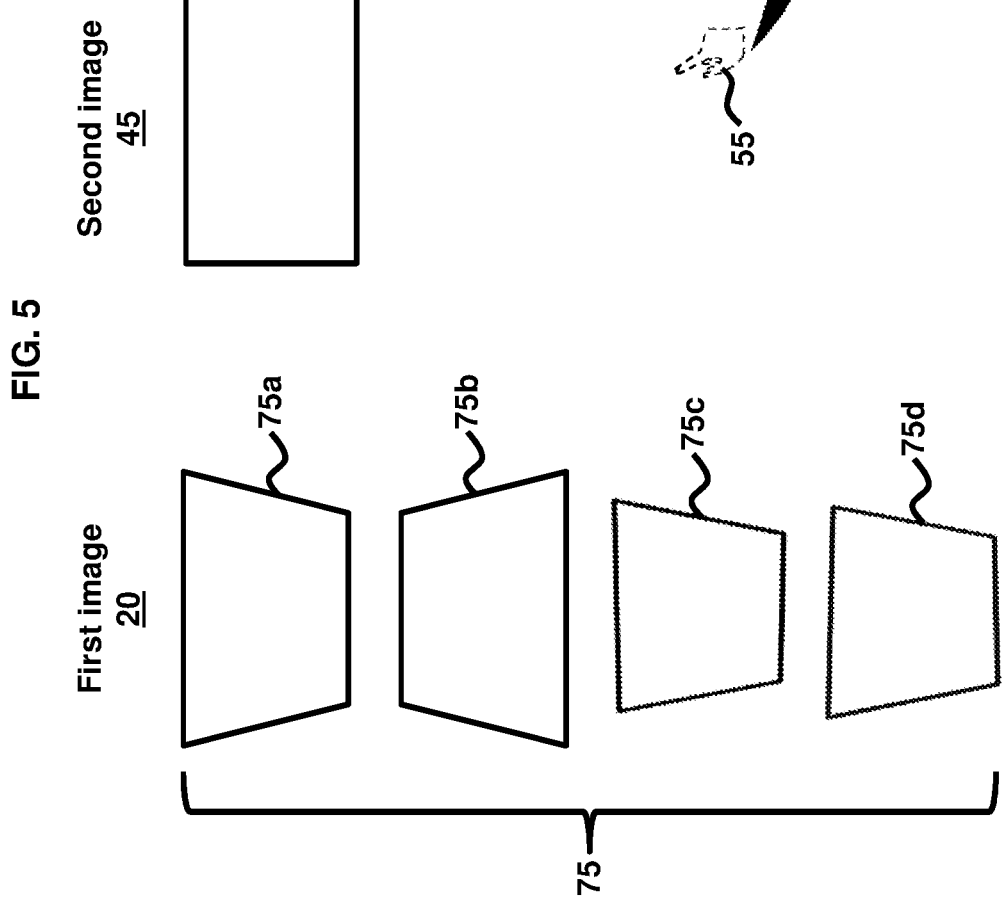

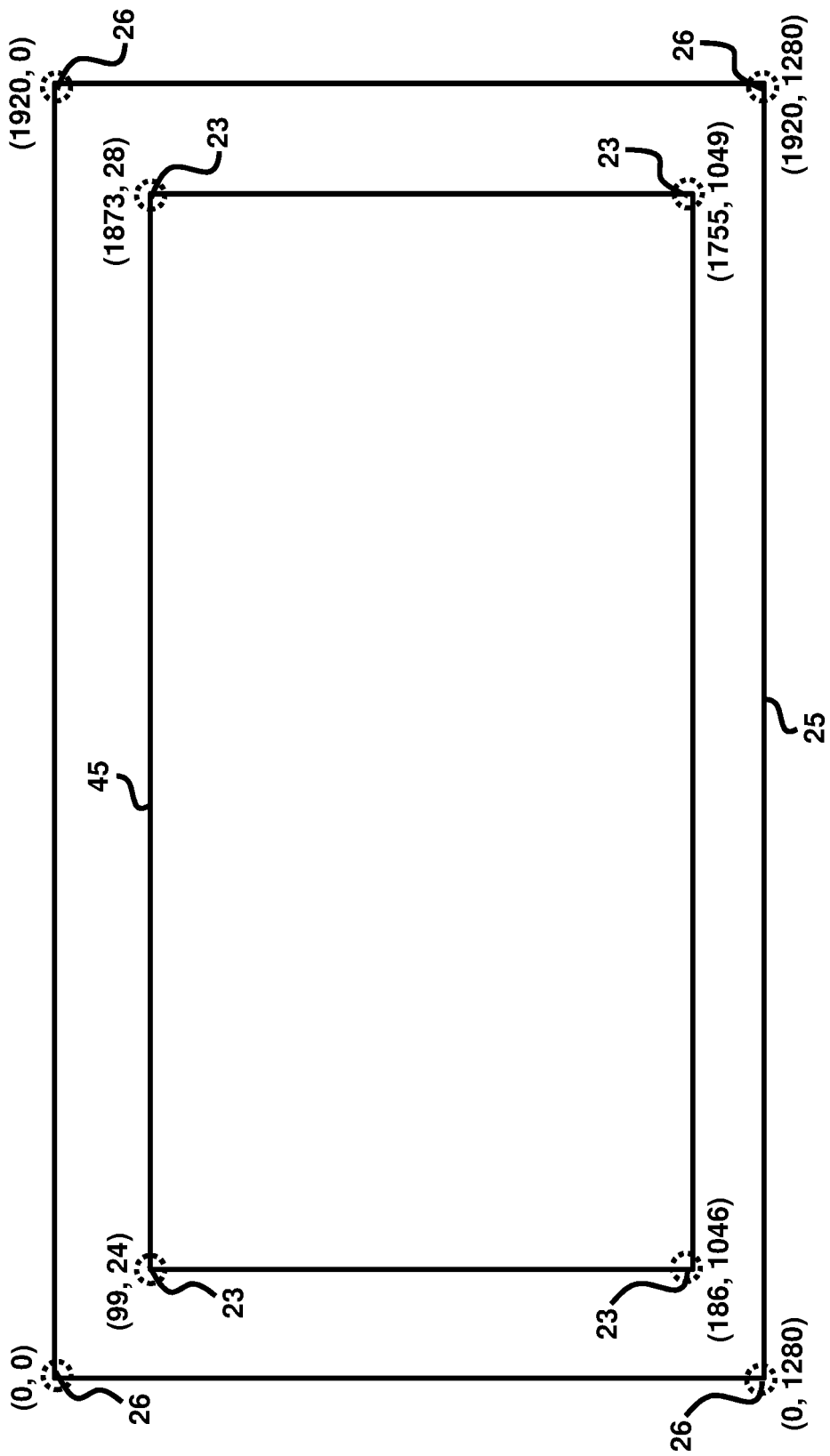

PERSPECTIVE TRANSFORMATION OF IMAGES VIA TOUCH SIGNALS

BACKGROUND

Multimedia projectors display images onto a viewing screen. Misaligned projectors display images that are skewed. Keystone correction is a function to re-align skewed images.

BRIEF DESCRIPTION OF THE DRAWINGS

The following detailed description references the drawings, in which:

FIG. 2 is a block diagram illustrating the processor of FIG. 1 correlating corner coordinates to perform a perspective transformation of an image, according to an example.

FIG. 5 is a schematic diagram illustrating the images used by the calibration device of FIG. 1 to perform the perspective transformation, according to an example.

FIG. 6 is a schematic diagram illustrating touch signals used to perform the perspective transformation by the calibration device of FIG. 1, according to an example.

FIG. 17C is a schematic diagram illustrating an example of a second image projected onto the touch screen of FIG. 17A, according to an example.

Figure 1:
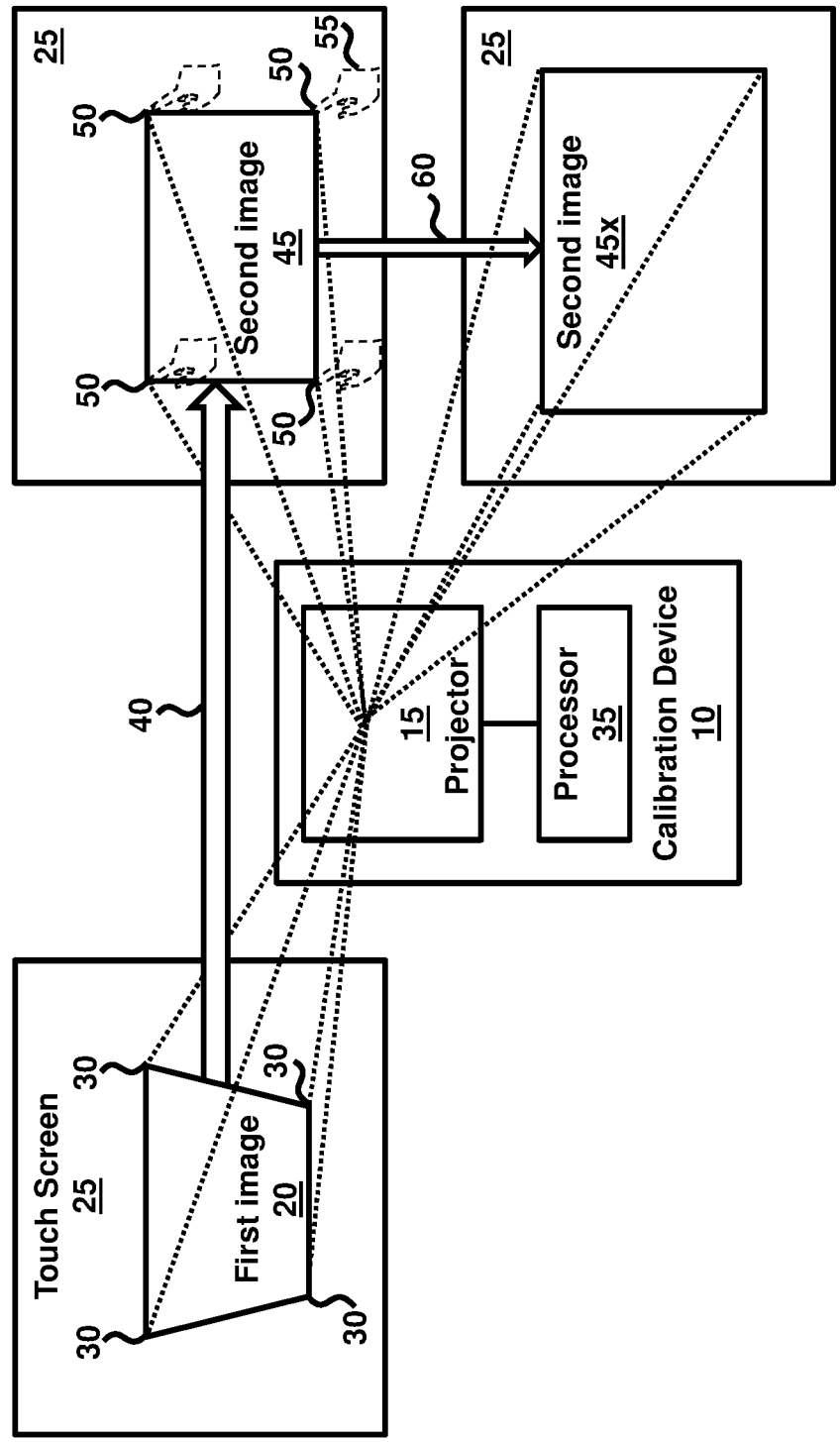
FIG. 1 is a block diagram illustrating a calibration device with a projector to perform a perspective transformation of an image, according to an example.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Keystone correction is a function that allows multimedia projectors that are not placed perfectly perpendicular to the plane of a display screen to skew the output image, thereby making the resulting projected image appear rectangular. Typical solutions to provide the keystone correction involve using camera-assisted approaches. However, the typical camera-assisted approaches tend to rely on computer vision technology, and thus it fails when the computer vision cannot accurately detect the projecting area due to hardware issues or camera calibration issues, or reduced ambient light conditions that all affect the camera's ability to detect the boundary of the projected image, thereby preventing a proper keystone correction from occurring.

In order to address this, an example described below provides a projector keystone correction technique that utilizes a touch input signal to perform the correction. The process involves projecting a first image onto a touch screen, which may be a touch mat positioned adjacent to a projector device. The first image may be distorted in size/shape/orientation due to an offset positioning of the projector compared to the touch screen. Next, the image undergoes a first perspective transformation, which modifies the size/shape of the first image into a second image. In an example, the second image is smaller in size than the first image. In order to then enlarge the size of the second image and still maintain the desired perspective size/shape, the four corners of the first image are selected by touching the touch mat at the locations of the four corners of the first image. Finally, a second perspective transformation occurs to resize the second image into a third image, in which the third image contains the desired perspective size/shape/orientation. The prior art utilizes camera-assisted keystone corrections, but does not appear to utilize a touch-assisted approach for keystone corrections.

In another example, only one transformation occurs. The corners of the touch screen do not have to be detected using image processing since the desired corners are received from the touch signal input, and thus, the unmodified first image transforms directly to the third image with the desired perspective size/shape/orientation.

In some examples, the various devices and processors described herein and/or illustrated in the figures may be embodied as hardware-enabled modules and may be configured as a plurality of overlapping or independent electronic circuits, devices, and discrete elements packaged onto a circuit board to provide data and signal processing functionality within a computer. An example might be a comparator, inverter, or flip-flop, which could include a plurality of transistors and other supporting devices and circuit elements. The modules that are configured with electronic circuits process computer logic instructions capable of providing digital and/or analog signals for performing various functions as described herein. The various functions can further be embodied and physically saved as any of data structures, data paths, data objects, data object models, object files, database components. For example, the data objects could be configured as a digital packet of structured data. The data structures could be configured as any of an array, tuple, map, union, variant, set, graph, tree, node, and an object, which may be stored and retrieved by computer memory and may be managed by processors, compilers, and other computer hardware components. The data paths can be configured as part of a computer CPU that performs operations and calculations as instructed by the computer logic instructions. The data paths could include digital electronic circuits, multipliers, registers, and buses capable of performing data processing operations and arithmetic operations (e.g., Add, Subtract, etc.), bitwise logical operations (AND, OR, XOR, etc.), bit shift operations (e.g., arithmetic, logical, rotate, etc.), complex operations (e.g., using single clock calculations, sequential calculations, iterative calculations, etc.). The data objects may be configured as physical locations in computer memory and can be a variable, a data structure, or a function. In the embodiments configured as relational databases (e.g., such Oracle® relational databases), the data objects can be configured as a table or column. Other configurations include specialized objects, distributed objects, object-oriented programming objects, and semantic web objects, for example. The data object models can be configured as an application programming interface for creating HyperText Markup Language (HTML) and Extensible Markup Language (XML) electronic documents. The models can be further configured as any of a tree, graph, container, list, map, queue, set, stack, and variations thereof. The data object files are created by compilers and assemblers and contain generated binary code and data for a source file. The database components can include any of tables, indexes, views, stored procedures, and triggers.

FIG. 1 is a block diagram illustrating a calibration device 10. In an example, the calibration device 10 may be an image projector device that displays images onto a corresponding display screen. In an example, the calibration device 10 may contain hardware modules to perform image processing for display. The calibration device 10 may be a computing device, according to an example. The calibration device 10 comprises a projector 15 to project a first image 20 onto a touch screen 25. The projector 15 may be any suitable type of projection device capable of projecting the first image 20. In an example, the projector 15 is integrated with the calibration device 10. In another example, the projector 15 is operatively connected to the calibration device 10. The projector 15 may be coupled to a camera or may be a stand-alone projector without a camera. In an example, the first image 20 may comprise a digital image containing pixels arranged in a predetermined format to provide a digital representation of the image to be displayed. The first image 20 may be formatted as any suitable image type; e.g., JPG, GIF, PNG, SVG, etc., among other types of image formats. The touch screen 25 may be a substantially flat screen that may provide input to the calibration device 10 using touch input on the touch screen 25. For example, the touch input may occur using a user's finger, a digital pen, a stylus, or any other type of input mechanism.

The first image 20 comprises a first set of four corner coordinates 30. For example, the first set of four corner coordinates 30 may be set to a $X_0,Y_0$; $X_1,Y_0$; $X_0,Y_1$; and $X_1,Y_1$ spatial coordinate system. In an example, the first set of four corner coordinates 30 may be set to (0,0), (1920, 0), (0, 1280), (1920, 1280) for a 1920×1280 resolution display. Moreover, the first set of four corner coordinates 30 may be set for any suitable resolution display size, according to an example. However, upon being displayed on the touch screen 25, the first set of four corner coordinates 30 may be skewed or otherwise altered from the above-described spatial coordinate system.

The calibration device 10 comprises a processor 35 to perform a first perspective transformation 40 of the first image 20 into a second image 45 for projection onto the touch screen 25 by the projector 15. In some examples, the processor 35 may comprise a central processing unit (CPU) of the calibration device 10. In other examples the processor 35 may be a discrete component independent of other processing components in the calibration device 10. In other examples, the processor 35 may be a microprocessor, microcontroller, hardware engine, hardware pipeline, and/or other hardware-enabled device suitable for receiving, processing, operating, and performing various functions required by the calibration device 10. The processor 35 may be provided in the calibration device 10, coupled to the calibration device 10, or communicatively linked to the calibration device 10 from a remote networked location, according to various examples.

In an example, the first perspective transformation 40 of the first image 20 into a second image 45 may occur using any suitable imaging processing technique performed by the processor 35. In an example, the first perspective transformation 40 may result in the size of the first image 20 being altered to create the second image 45. According to another example, the first perspective transformation 40 may result in the shape of the first image 20 being altered to create the second image 45. In another example, the first perspective transformation 40 may result in the perspective view of the first image 20 being altered to create the second image 45. In other examples, a combination of these alterations of the first image 20 may occur in the first perspective transformation 40 to create the second image 45. Upon performing the first perspective transformation 40 of the first image 20 into the second image 45, the second image 45 is displayed on the touch screen 25; e.g., projected by the projector 15 onto the touch screen 25.

The second image 45 comprises a second set of four corner coordinates 50 that are different from the first set of four corner coordinates 30 associated with the first image 20. For example, the second set of four corner coordinates 50 may be set to a $X_0,Y_0$; $X_0,Y_0$; $X_0,Y_1$; and $X_1,Y_1$ spatial coordinate system. In an example, the second set of four corner coordinates 50 may be set to (0,0), (1920, 0), (0, 1280), (1920, 1280) fora 1920×1280 resolution display. Moreover, the second set of four corner coordinates 50 may be set for any suitable resolution display size, according to an example.

Thereafter, the processor 35 is to receive at least one touch signal 55 associated with a second set of four corner coordinates 50 associated with the second image 45 from the touch screen 25. As described above, the at least one touch signal 55 may be the result of a touch input onto the touch screen 25 by a user's finger, digital pen, stylus, or other suitable input mechanism. While the drawings depict the at least one touch signal 55 as being the result of a user's finger, this is merely for representation purposes only, and the examples described herein are not limited by this example representation. When the touch input onto the touch screen 25 occurs, this generates the at least one touch signal 55 being transmitted from the touch screen 25 to the processor 35. Furthermore, the touch input occurs at the location(s) of the second set of four corner coordinates 50 associated with the second image 45. Accordingly, the at least one touch signal 55 is aligned to the second set of four corner coordinates 50.

Next, the processor 35 is to perform a second perspective transformation 60 of the second image 45 using the second set of four corner coordinates 50 to resize the second image; e.g., resized second image 45x, based on the first set of four corner coordinates 30. In an example, the second perspective transformation 60 to create the resized second image 45x may occur using any suitable imaging processing technique performed by the processor 35. In an example, the second perspective transformation 60 may result in the size of the second image 45 being altered to create the resized second image 45x. According to another example, the second perspective transformation 60 may result in the shape of the second image 45 being altered to create the resized second image 45x. In another example, the second perspective transformation 60 may result in the perspective view of the second image 45 being altered to create the resized second image 45x. In other examples, a combination of these alterations of the second image 45 may occur in the second perspective transformation 60 to create the resized second image 45x. In an example, the resized second image 45x is larger than the second image 45. Upon performing the second perspective transformation 60 of the second image 45 into the resized second image 45x, the resized second image 45x is displayed on the touch screen 25; e.g., projected by the projector 15 onto the touch screen 25.

According to another example, the processor 35 may only have to perform one perspective transformation; e.g., either the first perspective transformation 40 or the second perspective transformation 60, but not both. In this regard, the single perspective transformation alters the first image 20 directly to the resized second image 45x without first having to go through the process of creating the second image 45. In another example, the first perspective transformation 40 and the second perspective transformation 60 occur simultaneously thereby resulting in a direct change from the first image 20 to the resized second image 45x.

FIG. 2, with reference to FIG. 1, is a block diagram illustrating that the processor 35 is to correlate the first set of four corner coordinates 30 with the second set of four corner coordinates 50 to perform the second perspective transformation 60 of the second image 45 into the resized second image 45x. In this regard, the processor 35 may utilize image processing techniques to correlate the first set of four corner coordinates 30 with the second set of four corner coordinates 50. For example, the processor 35 may calculate a homography matrix to perform the correlation.

Figure 3:
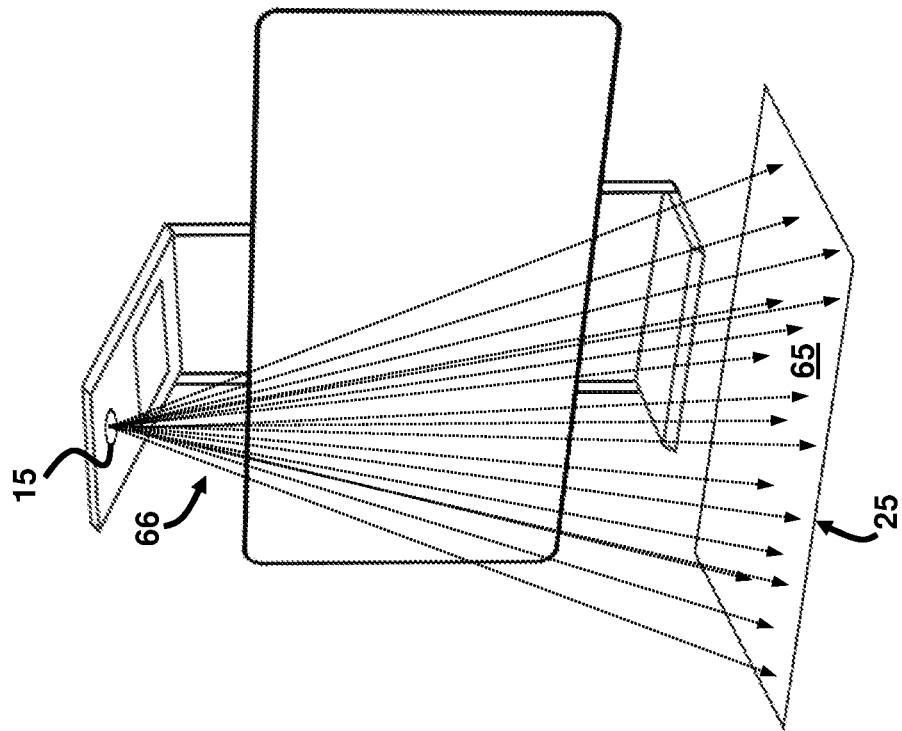
FIG. 3 is a schematic diagram illustrating the touch screen of the calibration device of FIG. 1 incorporating a touch mat, according to an example.

FIG. 3, with reference to FIGS. 1 and 2, illustrates that the touch screen 25 comprises a touch mat 65. In an example, the touch mat 65 has no discernable patterns on its surface and any suitably sized touch mat 65 may be used. In one example, the touch mat 65 may be 24"×16". The touch mat 65 is provided to receive touch inputs from a user's finger, digital pen, stylus, or other mechanism, etc. in order to generate the at least one touch signal 55. The touch mat 65 is communicatively linked to the calibration device 10 or the processor 35, or both, in order to transmit the at least one touch signal 55 to the processor 35 for processing. In an example, the touch mat 65 may be positioned to receive images 66 from the projector 15. For example, the images 66 may comprise any of the first image 20, second image 45, and resized second image 45x. According to an example, the projector 15 may downwardly project the images 66 onto the touch mat 65. However, other orientations and relative placements of the projector 15 with respect to the touch mat 65 may be utilized.

Figure 4:
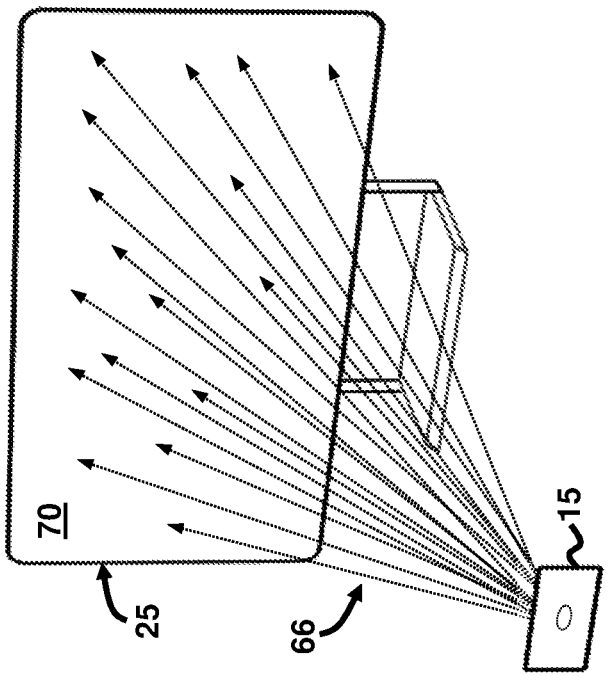
FIG. 4 is a schematic diagram illustrating the touch screen of the calibration device of FIG. 1 incorporating a display screen, according to an example.

FIG. 4, with reference to FIGS. 1 through 3, illustrates that the touch screen 25 comprises a computer display screen 70. In an example, the computer display screen 70 may be a computer monitor, which may have its own touch input capabilities. In another example, the computer display screen 70 may be any type of touch screen device. While FIG. 4 depicts an arrangement with the projector aligned in front of the computer display screen 70, this is merely a representation, and as such the computer display screen 70 may be a coupled to the projector 15. In this regard, the projector 15 may be a standalone device or may be directly attached to the computer display screen 70.

FIG. 5, with reference to FIGS. 1 through 4, illustrates that the first image 20 comprises a first shape 75, and the second image 45 comprises a second shape 77 that is different from the first shape 75. The first image 20 may be oriented in any one of a number of different versions of the first shape 75. Due to the orientation of the touch screen 25 with respect to the projector 15, the first shape 75 may appear to be substantially trapezoidal in shape. In an example, with respect to the arrangement of FIG. 3, if the projector 15 is misaligned with respect to the touch screen 25, then the first shape 75 may appear as any of shapes 75a-75d. In another example, with respect to the arrangement of FIG. 4, if the projector 15 is positioned above the horizontal midplane of the touch screen 25, then the first shape 75 may appear as shape 75a. If the projector 15 is positioned below the horizontal midplane of the touch screen 25, then the first shape 75 may appear as shape 75b. If the projector 15 is positioned to the right of the vertical midplane of the touch screen 25, then the first shape 75 may appear as shape 75c. If the projector 15 is positioned to the left of the vertical midplane of the touch screen 25, then the first shape 75 may appear as shape 75d. Due to the first perspective transformation 40 and/or second transformation 60, the second image 45 may appear to be substantially rectangular as indicated in second shape 77.

FIG. 6, with reference to FIGS. 1 through 4, illustrates that the at least one touch signal 55 comprises four touch signals 55a-55d. As indicated in FIG. 6, the four touch signals 55a-55d correspond to the second set of four corner coordinates 50. The four touch signals 55a-55d are independent from one another. In other words, each touch signal 55a-55d corresponds to its own separate touch input from a user's finger, digital pen, stylus, or other mechanism, etc.

Figure 7:
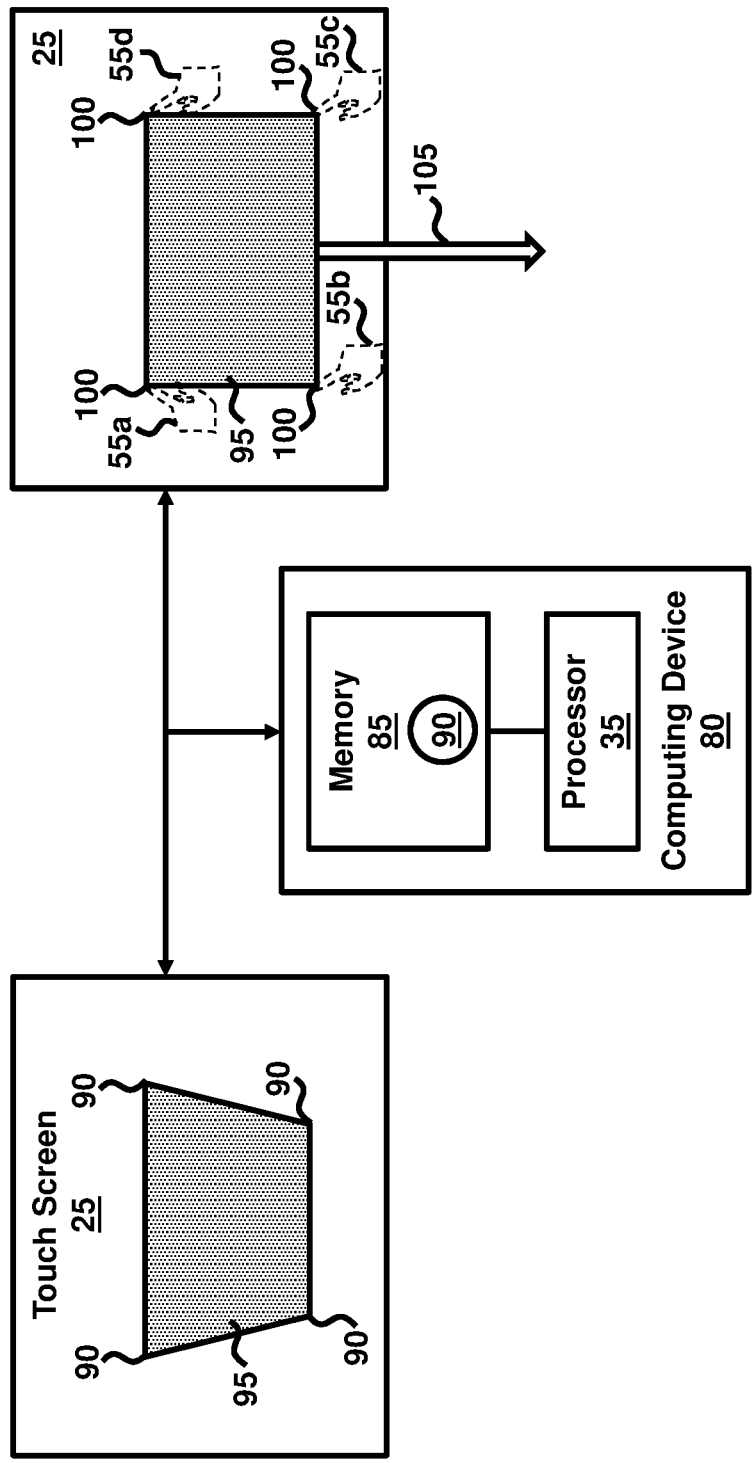
FIG. 7 is a block diagram illustrating a computing device to perform a perspective transformation of projected light, according to an example.

FIG. 7, with reference to FIGS. 1 through 3, illustrates a computing device 80. In some examples, the computing device 80 may be a personal computer, laptop computer, tablet device, smartphone, camera, television, or other type of electronic device with image processing capabilities. The computing device 80 comprises a memory 85 to store a first set of pixel corner coordinates 90 associated with light 95 that is projected onto a touch screen 25. The memory 85 may be Random Access Memory, Read-Only Memory, a cache memory, or other type of storage mechanism, according to an example. In an example, first set of pixel corner coordinates 90 may be set to a $X_0, Y_0; X_1, Y_0; X_0, Y_1;$ and $X_1, Y_1$ spatial coordinate system. In an example, the first set of pixel corner coordinates 90 may be set to (0,0), (1920, 0), (0, 1280), (1920, 1280) for a 1920×1280 resolution display. Moreover, the first set of pixel corner coordinates 90 may be set for any suitable resolution display size, according to an example. The light 95 may be any color of light that is projected onto the touch screen 25. In some examples, the touch screen 25 may be any type of touch input device that can receive touch input signals and have light 95 displayed or projected thereon. For example, the touch screen 25 may be a touch mat 65 or a computer display screen 70, as shown in FIGS. 3 and 4, respectively.

In FIG. 7, the computing device 80 also includes a processor 35 operatively connected to the memory 85. As described above, the processor 35 may comprise a central processing unit (CPU) of the computing device 80. In other examples the processor 35 may be a discrete component independent of other processing components in the computing device 80. In other examples, the processor 35 may be a microprocessor, microcontroller, hardware engine, hardware pipeline, and/or other hardware-enabled device suitable for receiving, processing, operating, and performing various functions required by the computing device 80. The processor 35 may be provided in the computing device 80, coupled to the computing device 80, or communicatively linked to the computing device 80 from a remote networked location, according to various examples.

The processor 35 is to process touch signals 55a-55d input to the touch screen 25 associated with a second set of pixel corner coordinates 100 of the projected light 95. As such, the touch signals 55a-55d correspond to the second set of pixel corner coordinates 100. The touch signals 55a-55d are independent from one another. In other words, each touch signal 55a-55d corresponds to its own separate touch input from a user's finger, digital pen, stylus, or other mechanism, etc. The touch screen 25 is communicatively linked to the processor 35 to facilitate the transfer of the touch signals 55a-55d from the touch screen 25 to the processor 35. In an example, the second set of pixel corner coordinates 100 may be set to a $X_0, Y_0; X_1, Y_0; X_0, Y_1$; and $X_1, Y_1$ spatial coordinate system. In an example, the second set of pixel corner coordinates 100 may be set to (0,0), (1920, 0), (0, 1280), (1920, 1280) for a 1920×1280 resolution display. Moreover, the second set of pixel corner coordinates 100 may be set for any suitable resolution display size, according to an example. The first set of pixel corner coordinates 90 and the second set of pixel corner coordinates 100 are different from one another.

The processor 35 is also to perform a perspective transformation 105 of the projected light 95 using the first set of pixel corner coordinates 90 and the second set of pixel corner coordinates 100. In an example, the perspective transformation 105 of the first image 20 into a second image 45 may occur using any suitable imaging processing technique performed by the processor 35. In an example, the perspective transformation 105 may result in the size of the projected light 95 being altered. According to another example, the perspective transformation 105 may result in the shape of the projected light 95 being altered. In another example, the perspective transformation 105 may result in the perspective view of the projected light 95 being altered. In other examples, a combination of these alterations of the projected light 95 may occur in the perspective transformation 105. Upon performing the perspective transformation 105 of the projected light 95, the projected light 95 is displayed on the touch screen 25. In this regard, the processor 35 may utilize image processing techniques to correlate the first set of pixel corner coordinates 90 with the second set of pixel corner coordinates 100. According to an example, the processor 35 may calculate a homography matrix to perform the correlation of the first set of pixel corner coordinates 90 with the second set of pixel corner coordinates 100.

Figure 8:
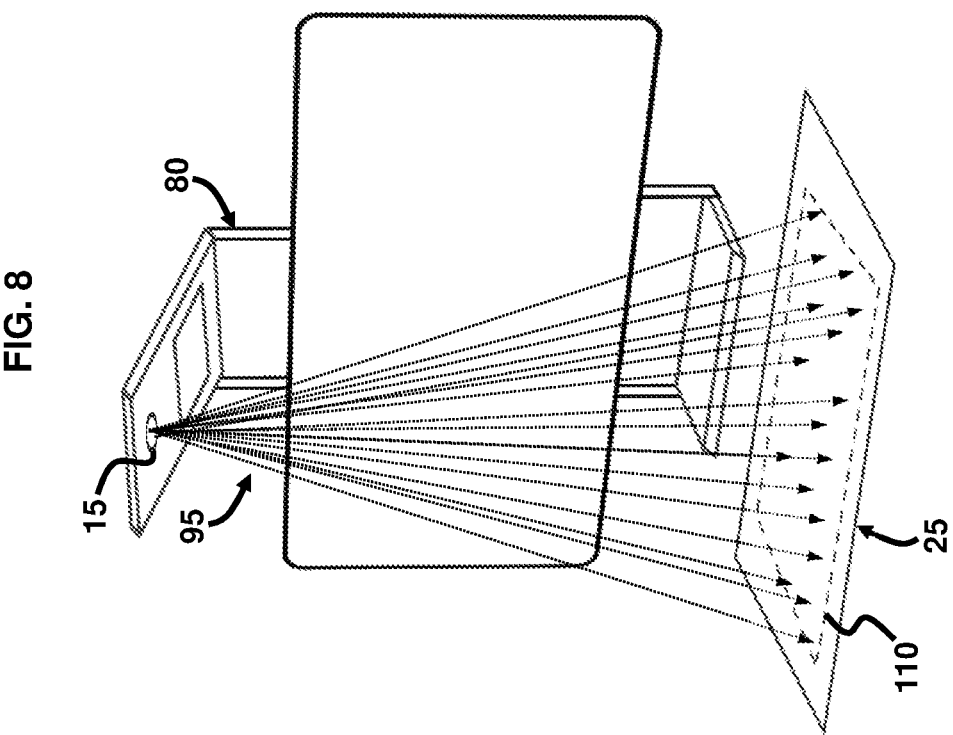
FIG. 8 is a schematic diagram illustrating the computing device of FIG. 7 with a projector, according to an example.

FIG. 8, with reference to FIGS. 1 through 7, illustrates that the computing device 80 comprises a projector 15 to project light 95 comprising an image 110 onto the touch screen 25. The projector 15 may be any suitable type of projection device capable of projecting light 95. In an example, the projector 15 is integrated with the computing device 80. In another example, the projector 15 is operatively connected to the computing device 80. The projector 15 may be coupled to a camera or may be a stand-alone projector without a camera. In an example, the image 110 may comprise a digital image containing pixels arranged in a predetermined format to provide a digital representation of the image to be displayed. The image 110 may be formatted as any suitable image type; e.g., JPG, GIF, PNG, SVG, etc., among other types of image formats. The touch screen 25 may be a substantially flat screen that may provide input to the computing device 80 using touch input on the touch screen 25. For example, the touch input may occur using a user's finger, a digital pen, a stylus, or any other type of input mechanism.

Figure 9:
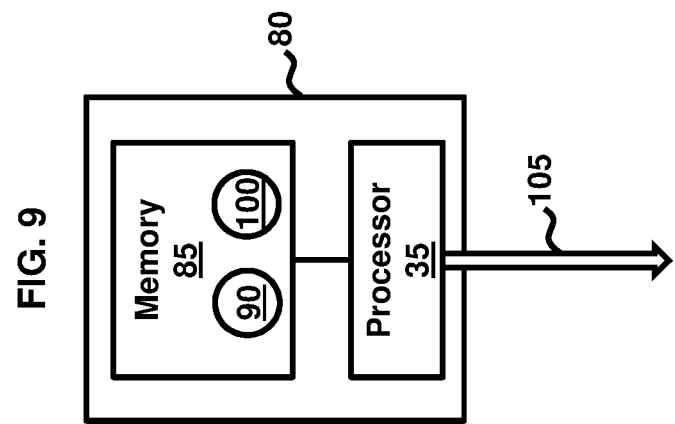
FIG. 9 is a block diagram illustrating the processor of FIG. 8 customizing the perspective transformation of the projected light, according to an example.

FIG. 9, with reference to FIGS. 1 through 8, illustrates that the processor 35 is to customize the perspective transformation 105 according to the first set of pixel corner coordinates 90 and the second set of pixel corner coordinates 100. In this regard, the perspective transformation 105 may be programmed through image processing code executed by the processor 35 to alter the image 110 corresponding to the first set of pixel corner coordinates 90 into the image corresponding to the second set of pixel corner coordinates 100. The customization permits various shapes and orientations of the image 110, as desired by a user.

Figure 10:
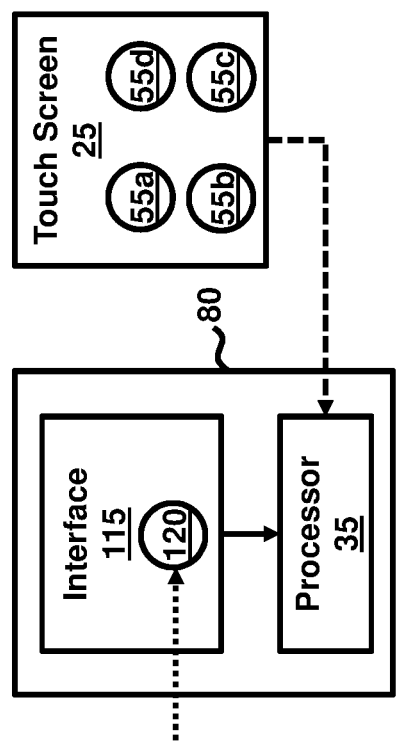
FIG. 10 is a block diagram illustrating the computing device of FIG. 7 with an interface, according to an example.

FIG. 10, with reference to FIGS. 1 through 9, illustrates that the computing device 80 comprises an interface 115 to input instructions 120 to initiate the processor 35 to receive the touch signals 55a-55d by the touch screen 25. In an example, the interface 115 may be integrated with the touch screen 25. In another example, the interface 115 may be communicatively linked to the touch screen 25. The interface 115 may permit a user to input the touch signals 55a-55d indirectly on the touch screen 25. For example, the touch screen 25 may not have its own touch sensing capabilities. However, the interface 115 permits a user to input the touch signals 55a-55d on the interface 115, which results in the touch screen 25 receiving the touch signals 55a-55d for transfer to the processor 35.

Figure 11:
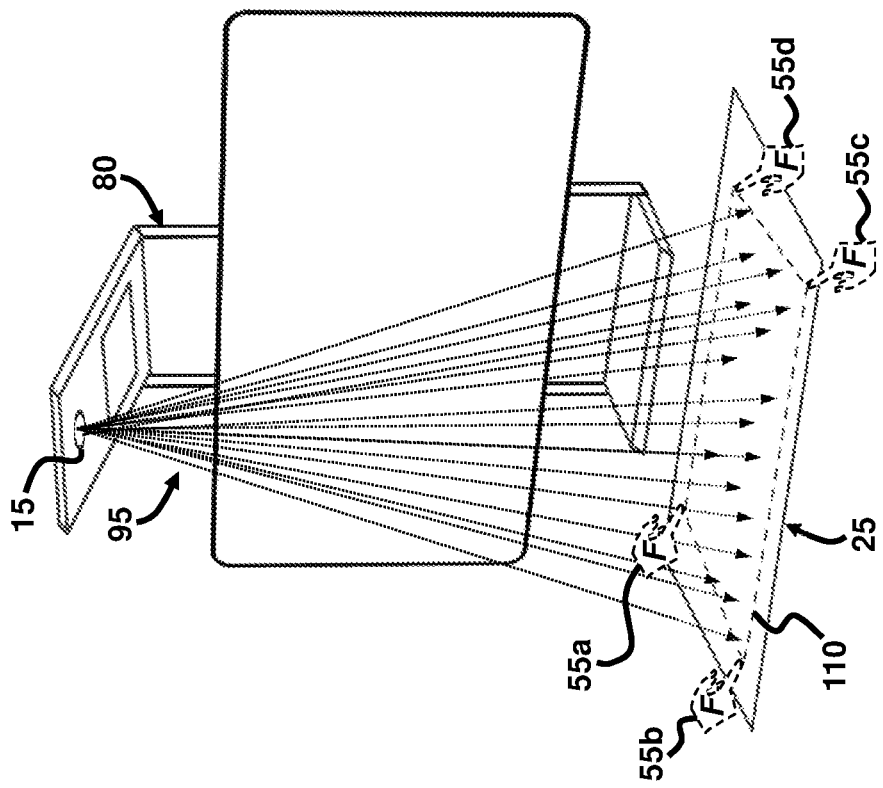
FIG. 11 is a schematic diagram illustrating a technique of inputting touch signals on the touch screen of the computing device of FIG. 7, according to an example.

FIG. 11, with reference to FIGS. 1 through 10, illustrates that the touch signals 55a-55d are initiated by the touch screen 25 due to a force F applied to the touch screen 25. In this regard, the force F may be applied by a user's finger, a digital pen, stylus, or other suitable mechanism, etc. The touch screen 25 may be tuned to initiate the touch signals 55a-55d based on a minimum threshold of force F being applied to the touch screen 25, where the minimum threshold of force F may be programmed or controlled by the processor 35.

Figure 12:
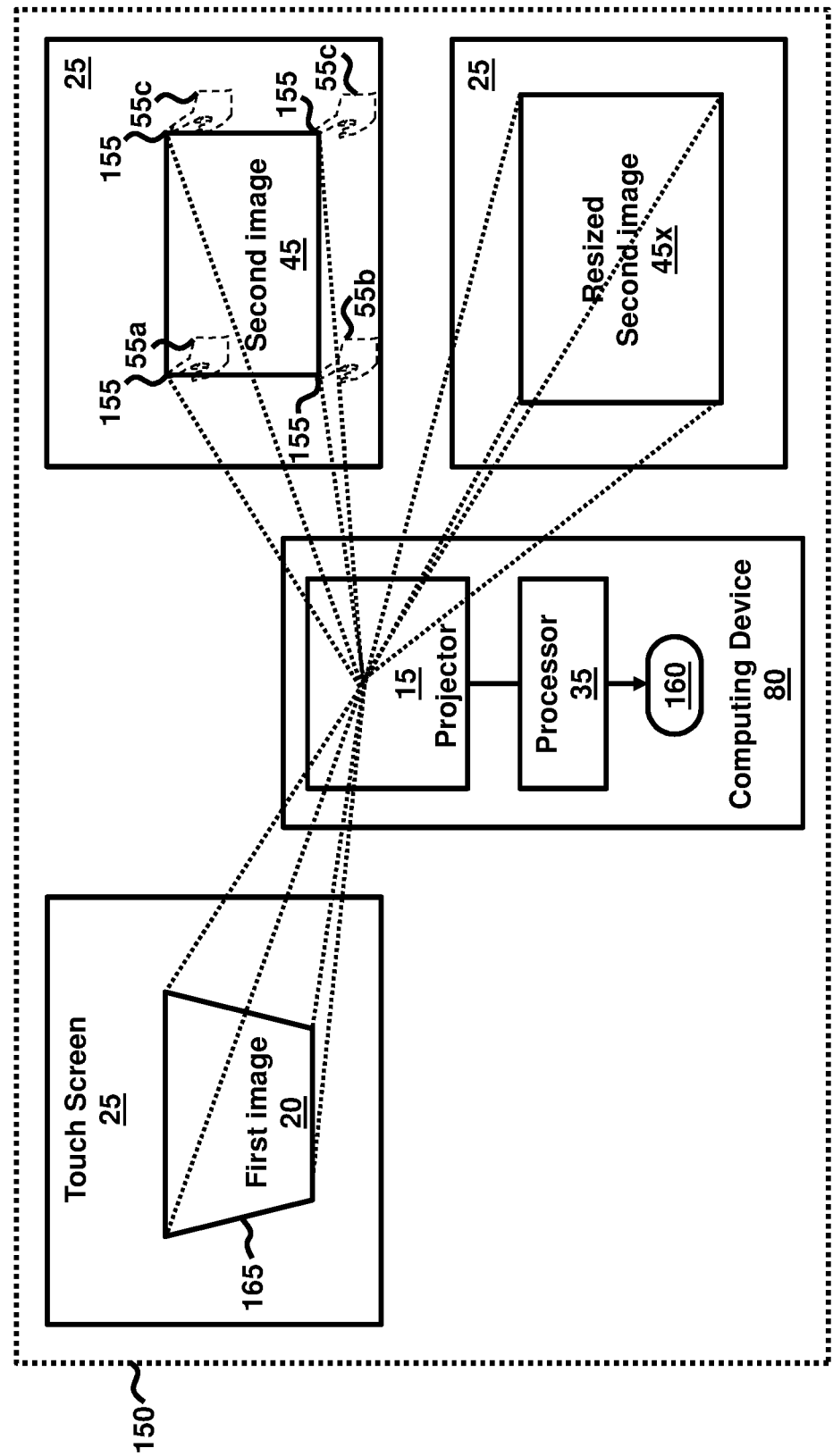
FIG. 12 is a block diagram illustrating a system to modify the sizes of images based on touch signals, according to an example.

FIG. 12, with reference to FIGS. 1 through 11, is a block diagram illustrating a system 150 comprising a computing device 80 with a processor 35 to initiate projection of a first image 20 by a projector 15 onto a touch screen 25, modify a size of the first image 20 to create a second image 45, and receive touch signals 55a-55d from the touch screen 25, where the touch signals 55a-55d are associated with spatial coordinates of the four corners 155 of the second image 45. In an example, the spatial coordinates of the four corners 155 of the second image 45 may be set to a $X_0, Y_0; X_1, Y_0; X_0, Y_1$; and $X_1, Y_1$ spatial coordinate system. In an example, the spatial coordinates of the four corners 155 of the second image 45 may be set to (0,0), (1920, 0), (0, 1280), (1920, 1280) for a 1920×1280 resolution display. Moreover, the spatial coordinates of the four corners 155 of the second image 45 may be set for any suitable resolution display size, according to an example.

The processor 35 is to calculate a homography matrix 160 using the spatial coordinates of the four corners 155 of the second image 45, and calibrate a projection area 165 of the first image 20 into a resized second image 45$x$ based on the spatial coordinates of the four corners 155 of the second image 45 using the homography matrix 160. Here, the homography matrix 160 uses the input of the spatial coordinates of the four corners 155 of the second image 45 in order to generate the calculations for the spatial coordinates of the resized second image 45$x$. These calculations allow the projection area 165 of the first image 20 to be calibrated into the resized second image 45$x$. In an example, the homography matrix 160 may calculate the spatial coordinates of the resized second image 45$x$ directly from the projection area 165 of the first image 20 without creating the second image 45. In another example, the second image 45 and the resized second image 45$x$ are produced simultaneously with the resized second image 45$x$ being the only image being displayed on the touch screen 25; e.g., the second image 45 is not displayed on the touch screen 25 in this example.

Figure 13:
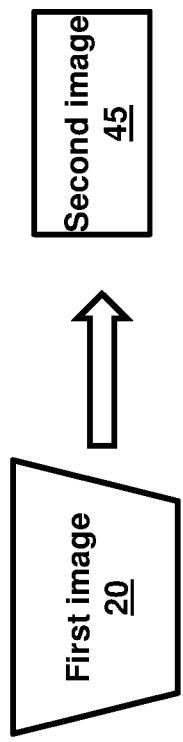
FIG. 13 is a schematic diagram illustrating a technique to reduce the size of an image in the system of FIG. 12, according to an example.
Figure 14:
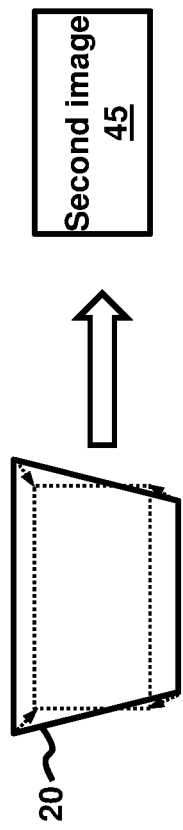
FIG. 14 is a schematic diagram illustrating a technique to modify the shape of an image in the system of FIG. 12, according to an example.
Figure 15:
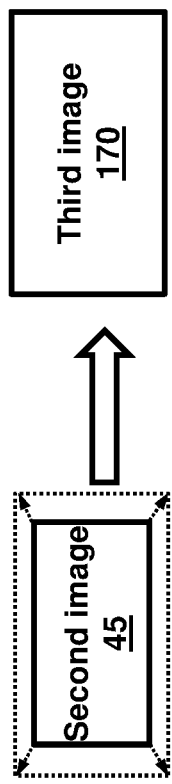
FIG. 15 is a schematic diagram illustrating a technique to enlarge the size of an image in the system of FIG. 12, according to an example.

The processor 35 calibrates the projector 15 to alter the first image 20 to create the second image 45 or the resized second image 45$x$. As shown in the block diagram of FIG. 13, with reference to FIGS. 1 through 12, the processor 35 is to reduce a size of the first image 20 to create the second image 45. As shown in the block diagram of FIG. 14, with reference to FIGS. 1 through 13, the processor 35 is to modify a shape of the first image 20 to create the second image 45. As shown in the block diagram of FIG. 15, with reference to FIGS. 1 through 14, the processor 35 is to enlarge a size of the second image 45 to create a third image 170. In an example, the third image 170 is the same as the resized second image 45$x$. In another example, the third image 170 is a completely different image than the resized second image 45$x$.

Figure 16:
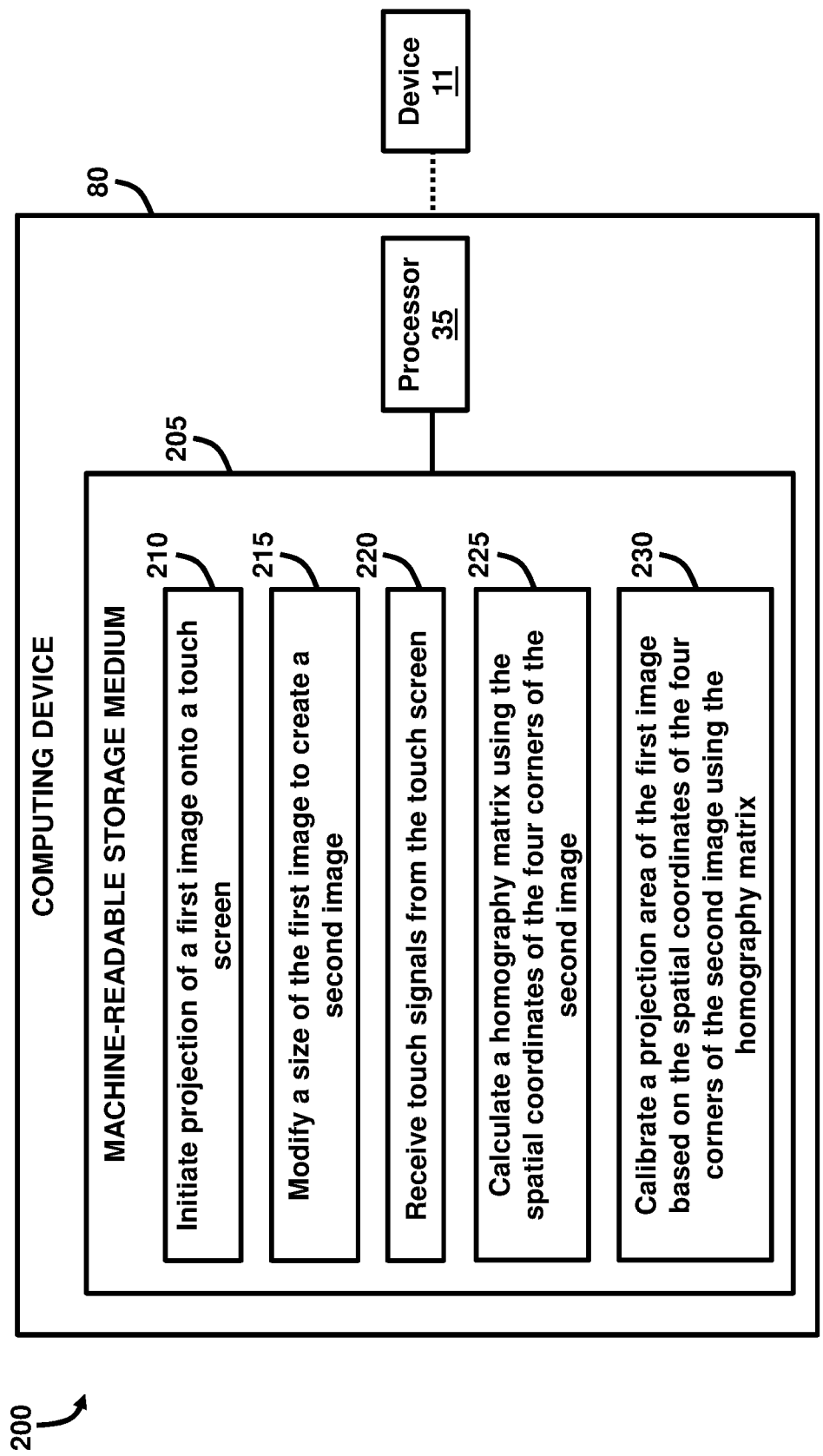
FIG. 16 is a block diagram illustrating a system to modify the sizes of images based on touch signals using computer-executable instructions, according to an example.

FIG. 16, with reference to FIGS. 1 through 15, illustrates an example system 200 to display status information of a computing device 80. In the example of FIG. 16, the computing device 80 includes the processor 35 and a machine-readable storage medium 205. Processor 35 may include a central processing unit, microprocessors, hardware engines, and/or other hardware devices suitable for retrieval and execution of instructions stored in a machine-readable storage medium 205. Processor 35 may fetch, decode, and execute computer-executable instructions 210, 215, 220, 225, and 230 to enable execution of locally-hosted or remotely-hosted applications for controlling action of the computing device 80. The remotely-hosted applications may be accessible on remotely-located devices; for example, communication device 11. For example, the communication device 11 may be a computer, tablet device, smartphone, or remote server. As an alternative or in addition to retrieving and executing instructions, processor 35 may include electronic circuits including a number of electronic components for performing the functionality of the instructions 210, 215, 220, 225, and 230.

The machine-readable storage medium 205 may be any electronic, magnetic, optical, or other physical storage device that stores executable instructions. Thus, the machine-readable storage medium 205 may be, for example, Random Access Memory, an Electrically-Erasable Programmable Read-Only Memory, volatile memory, non-volatile memory, flash memory, a storage drive (e.g., a hard drive), a solid-state drive, optical drive, any type of storage disc (e.g., a compact disc, a DVD, etc.), and the like, or a combination thereof. In one example, the machine-readable storage medium 205 may include a non-transitory computer-readable storage medium. The machine-readable storage medium 205 may be encoded with executable instructions for enabling execution of remotely-hosted applications accessed on the remotely-located devices 11.

In an example, the processor 35 of the computing device 80 executes the computer-executable instructions 210, 215, 220, 225, and 230. For example, initiating instructions 210 may initiate projection of a first image 20 onto a touch screen 25. The processor 35 may initiate the projector 15 to project the first image 20 onto the touch screen 25 automatically based on a preprogrammed set of instructions. Alternatively, the processor 35 may initiate the projector 15 to project the first image 20 onto the touch screen 25 based on user input through the touch screen 25 or by engaging a mechanism, such as a switch or button, etc., on the computing device 80. Modifying instructions 215 may modify a size of the first image 20 to create a second image 45. The size of the first image 20 may be resized, reshaped, or the perspective view may be altered in order to create the second image 45, according to some examples. Moreover, a combination of any of these forms of alteration of the first image 20 may be utilized to create the second image 45.

Receiving instructions 220 may receive touch signals 55$a$-55$d$ from the touch screen 25. The touch signals 55$a$-55$d$ are associated with spatial coordinates of four corners 155 of the second image 45. The touch signals 55$a$-55$d$ may be the result of input by a user's finger, digital pen, stylus, or other suitable mechanism, etc. at a minimum threshold force F applied on the touch screen 25 in order to initiate and/or generate the touch signals 55$a$-55$d$, according to an example.

Calculating instructions 225 may calculate a homography matrix 160 using the spatial coordinates of the four corners 155 of the second image 45. The homography matrix 160 may be generated based on any suitable image processing technique. Calibration instructions 230 may calibrate a projection area 165 of the first image 20 based on the spatial coordinates of the four corners 155 of the second image 45 using the homography matrix 160. In this regard, the projection area 165 of the first image 20 is altered to create the second image 45.

The instructions 210, 215, 220, 225, and 230, when executed, may cause the processor 35 to reduce a size of the first image 20 to create the second image 45. Moreover, the instructions 210, 215, 220, 225, and 230, when executed, may cause the processor 35 to modify a shape of the first image 20 to create the second image 45. Furthermore, the instructions 210, 215, 220, 225, and 230, when executed, may cause the processor 35 to enlarge a size of the second image 45 to create a third image 170.

An example for transitioning from the first image 20 to create the second image 45, or from the first image 20 directly to the third image 170 occurs by applying keystone corrections to the first image 20. The keystone corrections may occur using the positions associated with the touch signals 55$a$-55$d$ to create the second image 45 or third image 170. The processor 35 is provided to identify where the four corners 155 of the second image 45 is relative to the corners of the touch screen 25 or the corners of the maximum display area of the touch screen 25. This allows the processor 35 to compute a transform that causes the four corners 155 of the second image 45 to correspond to the corners of the touch screen 25 or the corners of the maximum display area of the touch screen 25. Accordingly, the processor 35 identifies where the first image 20 is relative to the corners of the touch screen 25, and where the target positions are for the second image 45 and third image 170. Then, the processor 35 builds the homography matrix 160; e.g., the mapping matrix. Thereafter, the processor 35 applies the homography matrix 160 to determine the target coordinates or positions of the second image 45 or the third image 170.

Figure 17A:
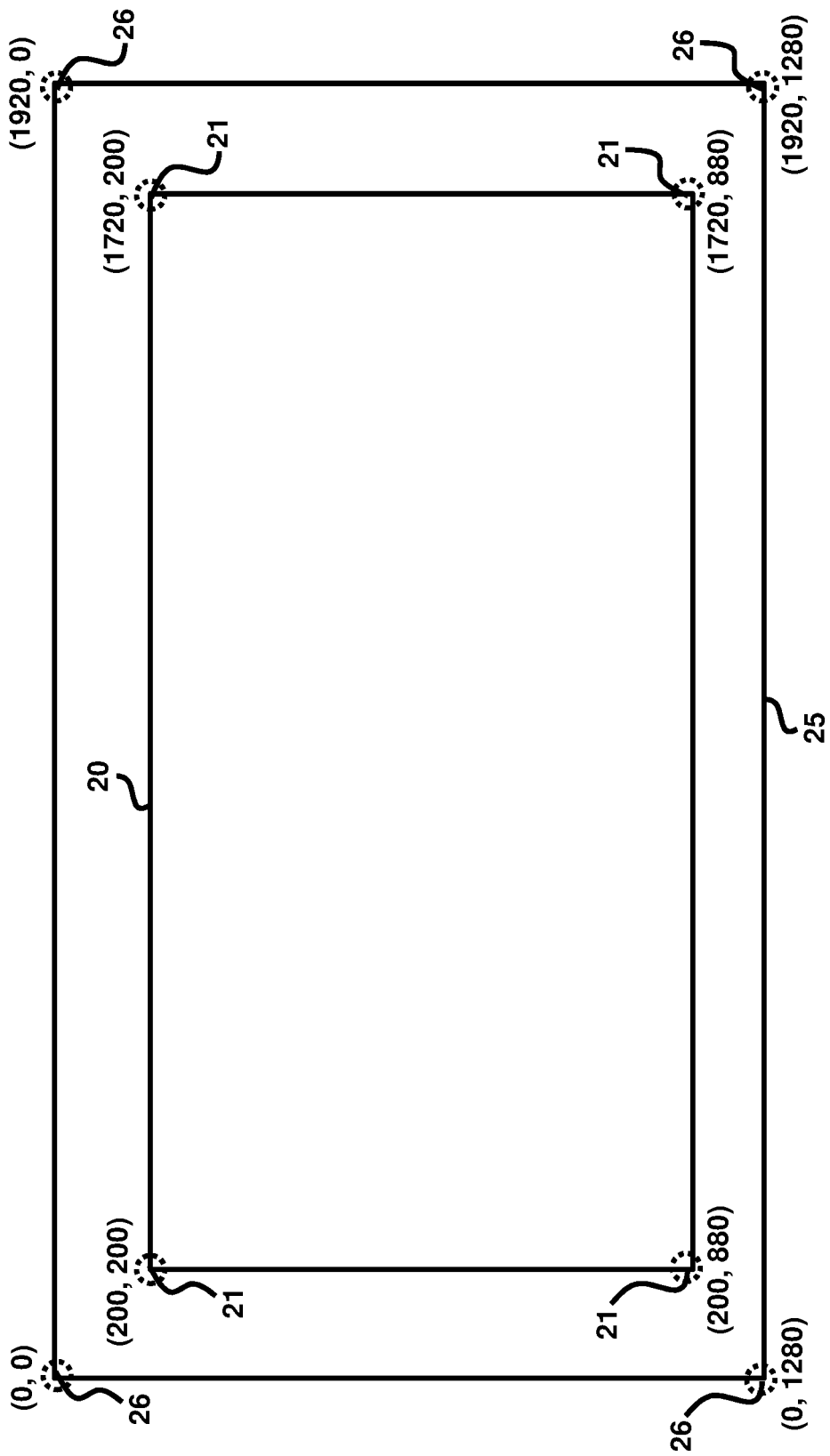
FIG. 17A is a schematic diagram illustrating an example of a first image projected onto a touch screen, according to an example.
Figure 17B:
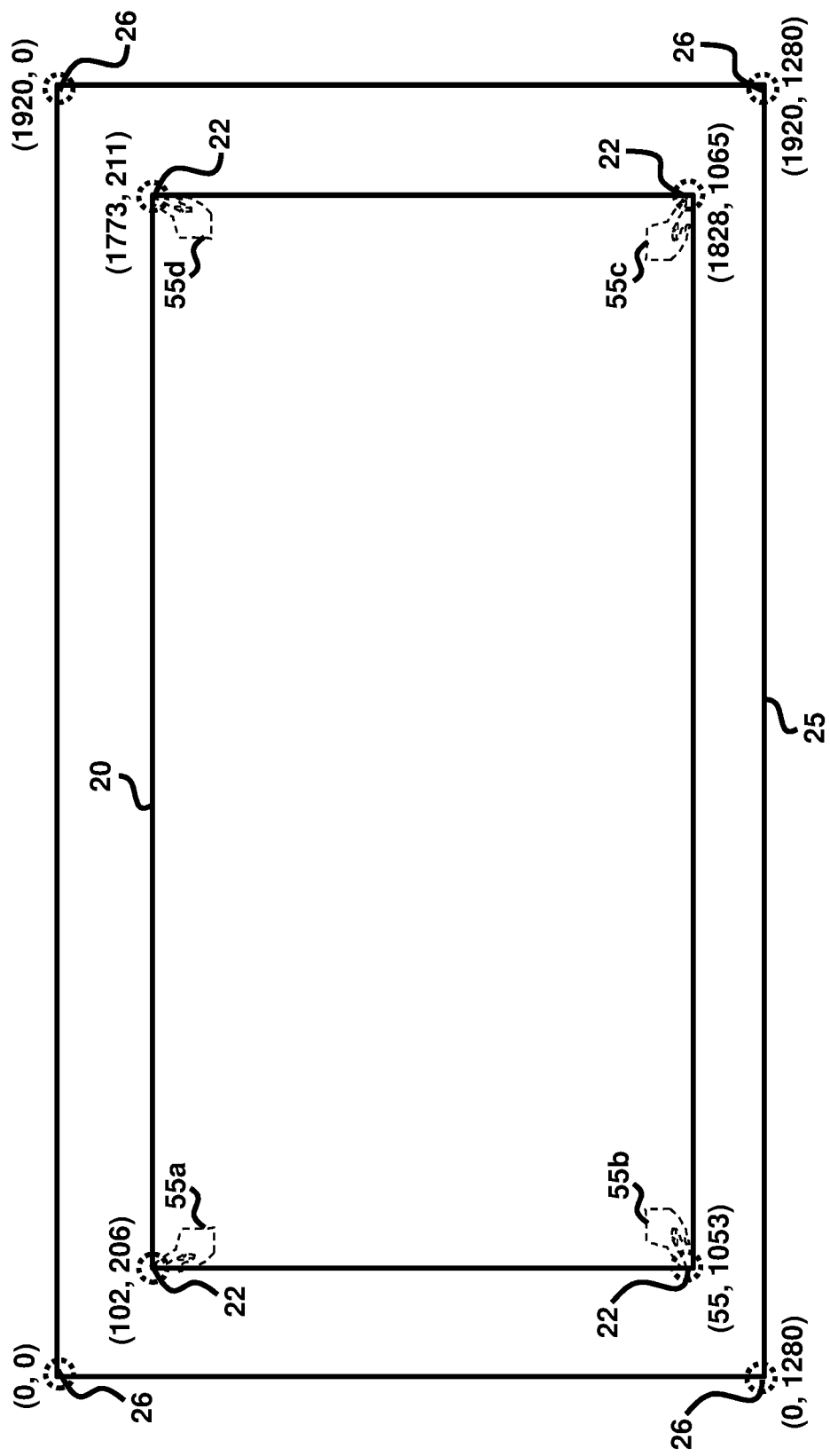
FIG. 17B is a schematic diagram illustrating an example of touch signal positions of the first image of FIG. 17A being projected onto the touch screen, according to an example.

FIG. 17A, with reference to FIGS. 1 through 16, illustrates an example of the projector view of the first image 20 on the touch screen 25; e.g., for an example projector image of 1920×1080. The coordinates associated with the corners 21 of the first image 20 are indicated in FIG. 17A relative to the corners 26 of the touch screen 25, as an example. FIG. 17B, with reference to FIGS. 1 through 17A, illustrates an example of the view of the first image 20 projected on the touch screen 25 containing corners 22. The coordinates associated with the corners 22 of the first image 20 serve as the positions for the touch signals 55a-55d.

According to the example shown in FIG. 17B, the coordinates of the corners 22 of the first image 20 are: (102, 206), (55, 1053), (1828, 1065), (1773, 211). The coordinates of the corners 21 of the first image 20 from the projector 15 are: (200, 200), (200, 880), (1720, 880), (1720, 200). With this data, the processor 35 generates the homography matrix 160, which maps any point from a traditional camera system to a projector system of the computing device 80. In this regard, the processor 35 calculates a perspective transform from the four pairs of corner coordinates of the corresponding points; e.g., $X_0, Y_0$; $X_1, Y_0$; $X_0, Y_1$; and $X_1, Y_1$ spatial coordinate system. Here, the target four corners for the keystone correction are (0, 0), (0, 1280), (1920, 1280), (1920, 0). As such, the processor 35 applies the homography matrix 160 to these target four corners to generate the second image 45. According to the example coordinates provided in FIGS. 17A and 17B, the target four corners 23 for the projector 15 are: (99, 24), (186, 1046), (1755, 1049), (1873, 28), as shown in FIG. 17C, with reference to FIGS. 1 through 17B. While FIG. 17C indicates the second image 45 being projected onto the touch screen 25, the examples also provide that the third image 170 could be directly transformed from the first image 20 without first transforming into the second image 45, and as such the second image 45 shown on FIG. 17C could be replaced with the third image 170, according to an example.

The examples described above provide a technique to perform a keystone correction and/or calibration of a projector 15 without requiring a camera. This offers a cost savings and further reduces hardware and/or software complexity of the calibration device 10, computing device 80, and systems 150, 200. Furthermore, the techniques provided by the examples above enhances the reliability of the keystone correction by reducing the number of components required to perform the calibration. Additionally, the examples described above offer a more flexible solution to performing a keystone correction for any customized projection area 165. In this regard, one may dynamically change the projection area 165 with different touch signals 55a-55d. In other examples, a camera may be utilized to further enhance the keystone correction and/or calibration process.

The present disclosure has been shown and described with reference to the foregoing exemplary implementations. Although specific examples have been illustrated and described herein it is manifestly intended that the scope of the claimed subject matter be limited only by the following claims and equivalents thereof. It is to be understood, however, that other forms, details, and examples may be made without departing from the scope of the disclosure that is defined in the following claims.

What is claimed is:

1. A calibration device comprising:
a projector to project a first image onto a touch screen, wherein the first image comprises a first set of four corner coordinates; and
a processor to:
perform a first perspective transformation of the first image into a second image for projection onto the touch screen by the projector, wherein the second image comprises a second set of four corner coordinates;
receive four touch signals associated with a second set of four corner coordinates associated with the second image from the touch screen;
calculate a homography matrix using the second set of four corner coordinates associated with the second image; and
perform a second perspective transformation of the second image using the second set of four corner coordinates to resize the second image based on the first set of four corner coordinates by applying the homography matrix to the second set of four corner coordinates and without receiving another touch signal, wherein a resolution size of projected light of the first image is altered in the second perspective transformation.

2. The calibration device of claim 1, wherein the processor is to correlate the first set of four corner coordinates with the second set of four corner coordinates to perform the second perspective transformation of the second image.

3. The calibration device of claim 1, wherein the touch screen comprises a touch mat.

4. The calibration device of claim 1, wherein the touch screen comprises a computer display screen.

5. The calibration device of claim 1, wherein the first image comprises a first shape, and the second image comprises a second shape that is different from the first shape.

6. The calibration device of claim 1, wherein the four touch signals are independent from one another.

7. The calibration device of claim 1, wherein the homography matrix uses an input of the second set of four corner coordinates of the second image to generate calculations for spatial coordinates of a resized second image.

8. A computing device comprising:
a memory to store a first set of pixel corner coordinates associated with light that is projected onto a touch screen; and
a processor operatively connected to the memory, wherein the processor is to:
process four touch signals input to the touch screen associated with a second set of pixel corner coordinates of the projected light;
calculate a homography matrix using the second set of pixel corner coordinates of the projected light; and
perform a perspective transformation of the projected light using the first set of pixel corner coordinates and the second set of pixel corner coordinates and by applying the homography matrix to the second set of pixel corner coordinates without receiving another touch signal, wherein a resolution size of the projected light is altered in the perspective transformation.

9. The computing device of claim 8, comprising a projector to project light comprising an image onto the touch screen.

10. The computing device of claim 9, wherein the processor is to customize the perspective transformation according to the first set of pixel corner coordinates and the second set of pixel corner coordinates.

11. The computing device of claim 8, comprising an interface to input instructions to initiate the processor to receive the four touch signals by the touch screen.

12. The computing device of claim 8, wherein the four touch signals are initiated by the touch screen due to a force applied to the touch screen.

13. The computing device of claim 8, wherein the homography matrix uses an input of the second set of pixel corner coordinates to generate calculations for spatial coordinates of a resized projected light.

14. A non-transitory machine-readable storage medium comprising computer-executable instructions that when executed cause a processor of a computing device to:
   initiate projection of a first image onto a touch screen;
   modify a size of the first image to create a second image;
   receive four touch signals from the touch screen, wherein the four touch signals are associated with spatial coordinates of four corners of the second image;
   calculate a homography matrix using the spatial coordinates of the four corners of the second image; and
   calibrate a projection area of the first image based on the spatial coordinates of the four corners of the second image using the homography matrix and without receiving another touch signal, wherein a resolution size of projected light of the first image is altered to create the second image.

15. The machine-readable storage medium of claim 14, wherein the instructions, when executed, further cause the processor to reduce a size of the first image to create the second image.

16. The machine-readable storage medium of claim 14, wherein the instructions, when executed, further cause the processor to modify a shape of the first image to create the second image.

17. The machine-readable storage medium of claim 14, wherein the instructions, when executed, further cause the processor to enlarge a size of the second image to create a third image.

18. The machine-readable storage medium of claim 14, wherein the instructions, when executed, further cause the processor to cause the homography matrix to use an input of the spatial coordinates of the four corner coordinates of the second image to generate calculations for spatial coordinates of a resized second image.

19. The machine-readable storage medium of claim 14, wherein the instructions, when executed, further cause the processor to not display the second image on the touch screen.

20. The machine-readable storage medium of claim 14, wherein the instructions, when executed, further cause the processor to perform a calibration of the projection area occurs without using a camera.

* * * * *